Figure 1:
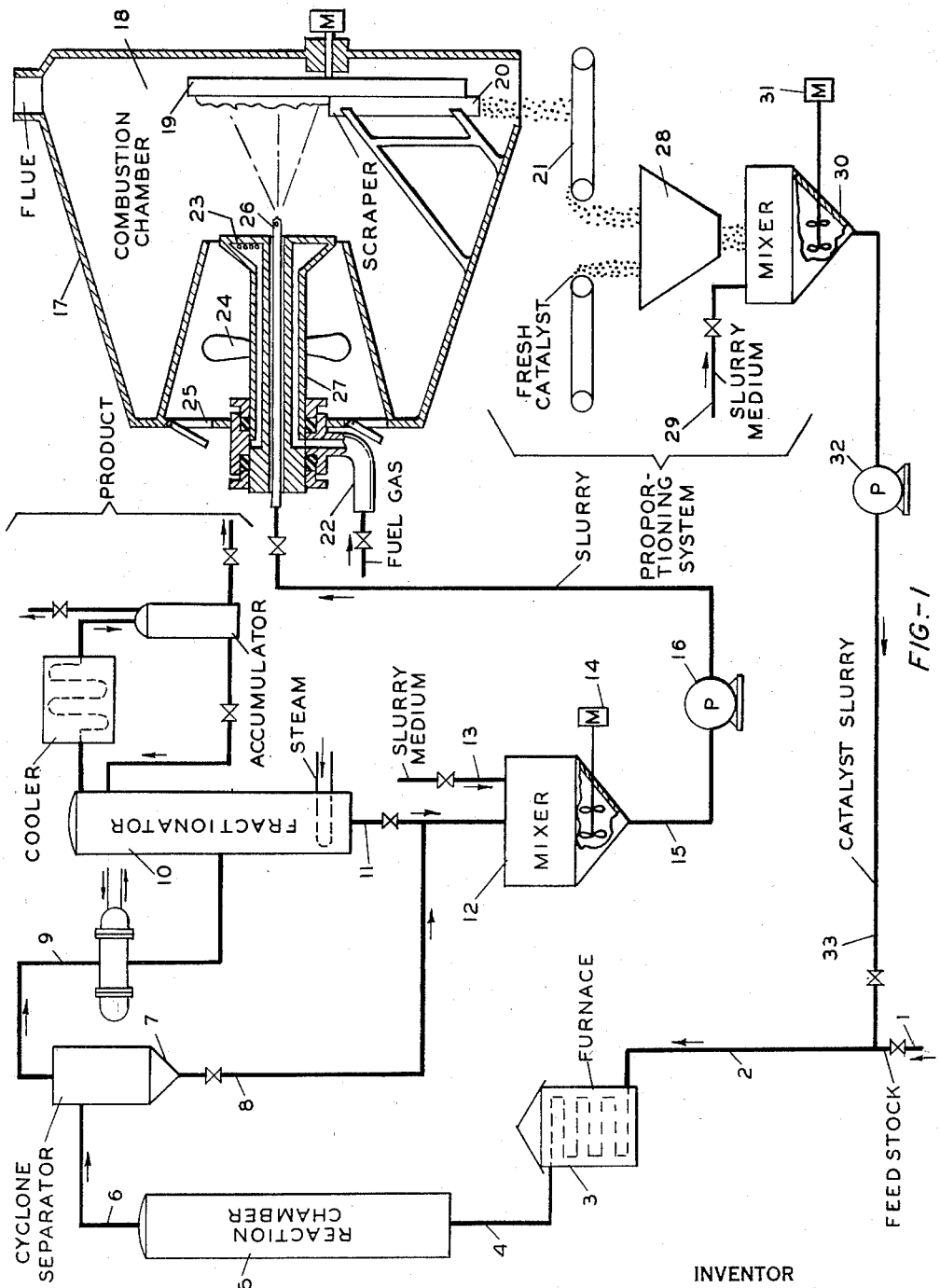

May 15, 1951 J. G. ALLEN 2,552,659
CATALYST REGENERATION PROCESS
Filed Aug. 31, 1944 2 Sheets-Sheet 1

INVENTOR
J. G. ALLEN
BY Hudson & Young
ATTORNEYS

May 15, 1951  J. G. ALLEN  2,552,659
CATALYST REGENERATION PROCESS
Filed Aug. 31, 1944  2 Sheets-Sheet 2

INVENTOR
J. G. ALLEN
BY Hudson and Young
ATTORNEYS

Patented May 15, 1951

2,552,659

UNITED STATES PATENT OFFICE 2,552,659

CATALYST REGENERATION PROCESS

John Gordon Allen, Bartlesville, Okla., assignor to Phillips Petroleum Company, a corporation of Delaware Application August 31, 1944, Serial No. 552,070

6 Claims. (Cl. 252—417)

This invention relates to the regeneration of catalysts employed in hydrocarbon conversions, petroleum refining, etc. More specifically it relates to the removal of sludges, residues and carbon from catalysts whose activity has been impaired because of the presence of these substances formed in the conversion process. As is well known, catalysts for the conversion of hydrocarbons become coated and impregnated with sludges, residues, and carbon formed by secondary reactions during the catalytic conversion process. These carbonaceous materials interfere with the conversion process by causing decreased activity and efficiency of the catalyst, and eventually the spent catalyst must be regenerated or replaced with a new catalyst. Since catalytic activity is essentially a surface phenomenon, the carbonaceous materials deposited upon the catalytic particles prevent the necessary contact between the hydrocarbon and catalyst to give the desired yield of conversion product. Therefore, most catalytic processes for conversion of hydrocarbons require the removal of this material in order to restore catalytic activity to the spent catalyst.

Catalysts used in petroleum processes are many and varied, consequently, their regeneration by removal of extraneous deposits thereon will of necessity depend upon the physical properties of the particular catalyst. In general, this invention relates to the regeneration of powdered or fluid type catalysts used in the conversion of hydrocarbons and preferably those capable of withstanding high temperatures without being permanently injured.

Examples of catalysts which withstand high temperatures for short periods of time are diatomaceous earths, natural clays such as fuller's earth, bauxite, and lime. This invention is not limited, however, to these catalysts, or to any other catalysts which may withstand high temperatures. Because of the very short time the catalyst is at the high temperature of regeneration many of the synthetic catalysts also can be regenerated by this invention without impairing their intrinsic catalytic activity.

The removal of extraneous deposits from spent catalysts by dissolution, evaporation, and oxidation is old per se. In such methods hot vapors and gases are passed with the powdered catalyst into a regeneration chamber where the extraneous deposits are removed. The hot gases and catalyst are usually in contact for several minutes, usually 5–10 minutes, before the regenerated catalyst is recovered from the system. This contact of the hot gases and products of regeneration with the powdered catalyst for the relatively longer time required for regeneration by the older methods in comparison with the present invention produces an inferior catalyst. As a result, the regeneration of the same catalyst by such processes cannot be continued indefinitely but the catalyst must be replaced with a fresh batch. Particularly in removal of carbonaceous materials by oxidation or burning, great difficulty is encountered in the regulation of the temperature of the regeneration process in order to prevent permanent injury to the catalyst. Complete removal of carbonaceous deposits on the powdered catalyst by oxidation is often very difficult by these methods. Furthermore, the prior art is confined to processes which require the aerating or stripping of the catalyst of oils and volatile hydrocarbons before the catalyst enters the regeneration chamber. This is an additional step requiring time and equipment, the elimination of which would expedite the regeneration process. By the invention herein described such difficulties and disadvantages are overcome.

The primary object of this invention is to enable the removal of carbonaceous deposits from catalysts without impairment of intrinsic catalytic activity. Another object is to effect a great savings in cost by lengthening the life of a catalyst and shortening the time required for the process. Another object is to effect regeneration of a catalyst wherein factors of time, temperature, and other regeneration conditions can be controlled. Still another object is to use a medium suspending the catalyst as part or all of the fuel for the regeneration process. Another object is to provide a means for separating a powdered or fluid catalyst from the effluent or bottoms of a hydrocarbon conversion process and a means to recover the catalyst in a dry powdered form. Still another object is to provide a thermal treatment which will increase the intrinsic activity of the catalyst. Other objects and advantages will appear from the description of the invention.

In general, the present invention is applicable to the regeneration of catalytic and other finely divided contact materials having carbonaceous deposits thereon following organic reactions such as hydrocarbon conversions. Specifically such conversions include cracking, dehydrogenation, isomerization, polymerization, reforming, etc.

As applied to cracking reactions the temperature may be in the range of 850–1150° F. and the finely divided contact material utilized in the proportion of about 50–500 weight per cent of the feed. For liquid or mixed phase operations pressures of 100–500 pounds per square inch or higher may be used.

I have found that the carbonaceous material adhering to the catalyst particle may be removed by spray evaporation with concurrent burning through injection of the catalyst into the combustion zone of a furnace. The process is practiced in such a way that the catalyst is conveyed to the furnace as a slurry and sprayed into the combustion zone of a short flame burner. The catalyst impinges upon a shield or plate at the end of the combustion zone and is scraped from the shield for removal from the furnace. In order to create the combustion zone and to inject the catalyst slurry therein, a burner rotating on a shaft is used wherein fuel gas enters at right angles to combustion air and the slurry enters through the rotating shaft. The slurry or material to be vaporized and burned is introduced as a spray into the turbulent mixture of gas and air at the point of combustion. In this way, the slurry is heated instantaneously to the temperature of the combusting gases. The vaporization of the slurry and expansion of the vapors on the catalyst particle is very rapid, and as a result a large portion of the carbonaceous material on the catalyst particle is dislodged. The small remaining portion is immediately burned. The process of removal of the carbonaceous material requires such a short time that the intrinsic activity of the catalytic particle is not harmed by the high temperature or possible local overheating. Furthermore, the process provides a continuous and rapid method of regeneration of a catalyst. Oil, water, solvents, and other fluids may be used as the suspension medium for the catalyst.

Improvement over other methods of regenerating catalyst by heating is evident from the control of furnace temperatures and atmospheres achieved by regulation of B. t. u. content of fuels and excess air. Elimination of such mechanical grinding and reclassification steps as might be needed after recovery of the catalyst is possible by variation in slurry ratio to solid, size and kind of spray nozzle, and furnace temperature. This process also prevents a useful and rapid means of separating catalyst from solvents and sludges.

An additional feature of the process comprises a compression step to force the slurry medium into the capillaries and voids of the catalytic particle. As the slurry is injected into the high temperature zone of the furnace, the vaporization and subsequent expansion of the vapor in the capillaries and voids dislodges a substantial amount of the carbonaceous material therein and from the surface of the catalytic particle. The presence of the slurry medium in the capillaries and voids also acts as a solvent to remove much of the carbonaceous material.

Figure 2:
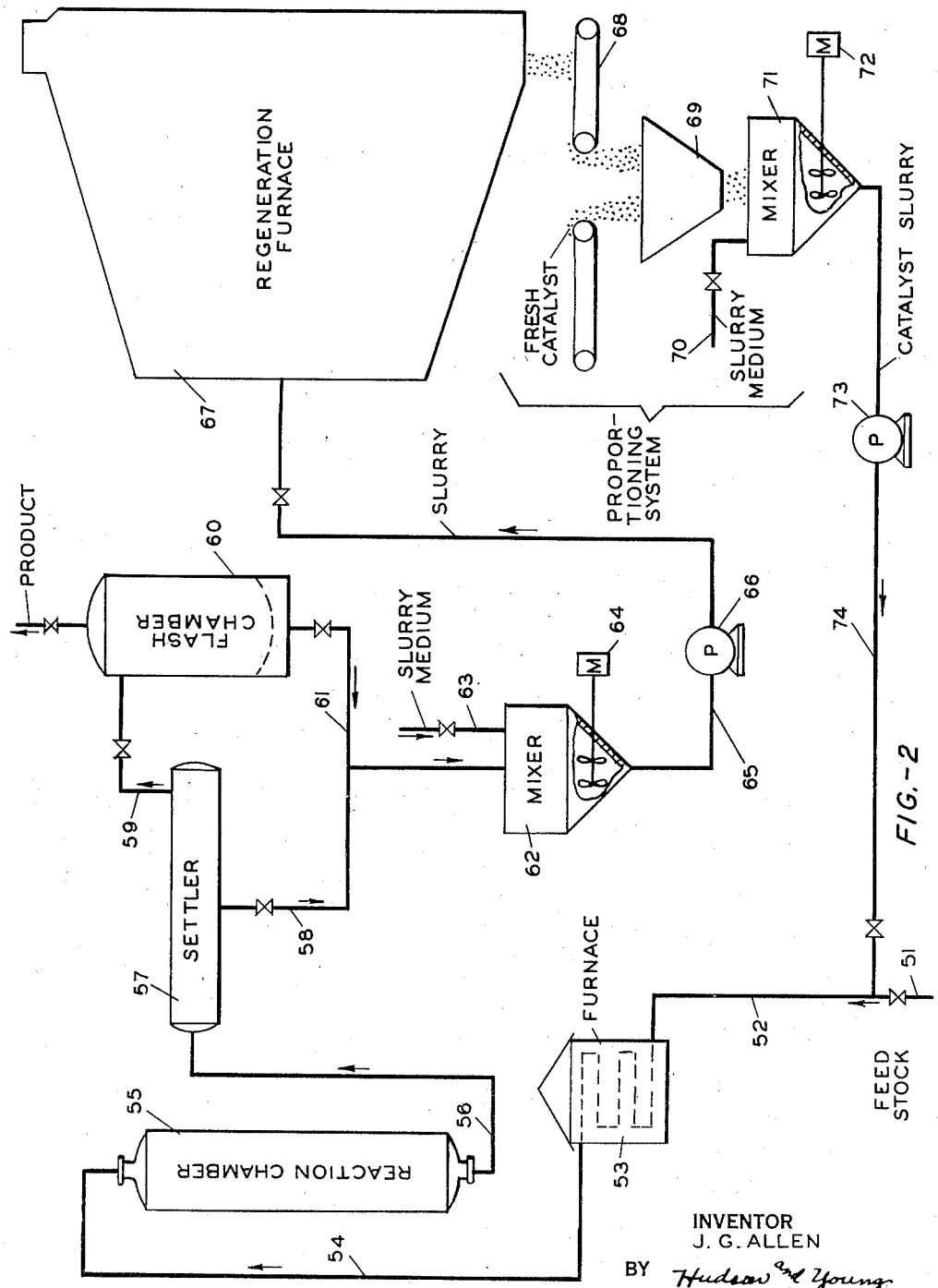

In the accompanying drawings, Fig. 1 portrays diagrammatically the arrangement of apparatus for carrying out the present invention in vapor phase catalytic processes, and Fig. 2 shows a modified arrangement for liquid phase catalytic processes.

Referring to Fig. 1, a hydrocarbon feed stock from line 1 is combined in the desired proportions with catalyst slurry from line 33. The catalyst slurry is composed of an oil medium and a powdered catalyst whose size may be within the range of 30 to 400 mesh. This mixture of catalyst and feed stock enters furnace 3 through line 2 where it is vaporized and heated to conversion temperatures. The hydrocarbon vapors and suspended catalyst pass through line 4 into the reaction chamber 5 wherein the hydrocarbons are converted. The vapor effluent and catalyst then pass out line 6 into one or a series of cyclone separators 7, where the spent catalyst is separated from this effluent. The separated catalyst is conveyed from cyclone separator 7 through line 8 by gravity into slurry mixer 12. The overhead product from the cyclone separator 7 passes through line 9 into fractionation equipment represented by 10. Sufficient amount of catalyst may remain with the overhead product from the cyclone or other separator to warrant further recovery of the catalyst. Under such circumstances, when the overhead product is passed through line 9 into fractionator 10 where vapor products are separated out the top of the fractionator, the heavy, liquid oils and catalyst are separated out the bottom. These heavy oils and catalyst, then, are conveyed to mixer 12 through conduit 11. A suspension medium for the catalyst, such as oil or water, flows into mixer 12 through line 13, and the catalyst and suspension medium are thoroughly mixed by stirrer 14 to form a slurry. After mixing, the slurry is conveyed through line 15 by pump 16 and injected into the combustion chamber 18 of furnace 17. The regenerated catalyst impinges upon rotating disc 19 and falls or is removed by scraper 20 from the bottom of the furnace onto conveyor 21.

The burner used in this process mixes fuel gas flowing from conduit 22 with air, essentially in the plane of rotation of fan 24 which is propelled by gas streams emitting from orifices in revolving arms 23 mounted integral with the fan blades 24. In this manner the burner utilizes the energy in the gas due to pressure, to induce air flow through openings 25 and to overcome pressure drop across the burner. This type of burner maintains a neutral atmosphere by complete combustion since a constant air-gas ratio can be obtained when operating at anywhere from a few ounces of pressure to pressures in excess of 25 pounds per square inch of gas. The gas pressure is the means of regulating the heat input through the burners required to vaporize the slurry. Furthermore, the fact that the gas orifices emit gas transverse to the air stream and are also revolving at a rate of speed in proportion to the gas pressure and flow, precludes admission of stratified air and gas stream entering the furnace and assures a uniform combustion atmosphere and temperature. By use of dampers in the air intake openings 25, air input may be decreased sufficiently to furnish the reducing atmosphere necessary in regenerating certain catalysts. The use of steam alone or steam and fuel gas in the turbine portion 23 of the burner to propel fan 24 results in excess air and an oxidizing atmosphere. When steam alone is used to impel fan 24, fuel gas or oil is introduced into the furnace with the slurry.

The slurry is injected into the furnace through a spray gun 26 inserted through the center of the revolving shaft 27. The injection is accomplished by either spraying or atomizing the slurry.

Temperatures ranging from 2000° F. to 3500° F. may be obtained in the furnace by appropriate regulation of air and fuel input. I prefer to use a relatively low combustion temperature of 2000° F. and an oxidizing atmosphere. Calculations show that a water slurry is more economical than an oil slurry and therefore in many cases I prefer to use a water as the slurry medium in practicing my invention.

After the regenerated catalyst has been deposited on conveyor 21, it is sent through a proportioning system 28 for combining the regenerated catalyst with new catalyst as makeup. Oil from line 29 and catalyst from the proportioner 28 are mixed in mixer 30 with the aid of stirrer 31. The thoroughly mixed slurry is then recycled through line 33 by means of pump 32.

The process is adaptable to liquid phase catalytic conversion processes with only minor changes as shown in Fig. 2. The present invention is especially applicable for regeneration of the natural clay catalysts used in such processes. In this type of operation the catalyst which is in finely divided form is mixed with oil by agitation and this mixture of catalyst and oil is fed to conventional thermal cracking stills. The product from the cracking stills passes to a vaporizer or flash tower where the vapors are taken overhead. The tar remaining in the bottom is reduced to 12 or 14 API gravity in which the spent catalyst is suspended. The conventional procedure to recover the catalyst is then to filter the catalyst from the tar by use of a filter press or Oliver filter. The filtered catalyst is washed, steamed and revivified by burning with steam and air. In applying the present invention as described in Fig. 2, catalyst slurry from line 74 is mixed with feed stock from line 51. The mixture is conveyed through line 52 into furnace 53 and from there through line 54 to reaction chamber 55. The liquid effluent and catalyst pass from reaction chamber 55 through line 56 into settler 57 wherein the catalyst settles to the bottom by reason of it having greater density than the liquid effluent. The catalyst is withdrawn from the bottom settler 57 and sent by gravity through conduit 58 to mixer 62. When further separation of catalyst is desirable, the liquid portion from settler 57 is conveyed through line 59 to flash chamber 60 where vaporization occurs; the vapor, substantially free of catalyst, is withdrawn from the top of the flash chamber 60. Spent catalyst is recovered from the bottom of chamber 60 and passed to mixer 62 through line 61. A slurry medium is introduced from line 63 into mixer 62 in order to form a slurry with the catalyst. The slurry is agitated by means of stirrer 64 and then forced through line 65 by pump 66. After injection of the slurry into the combustion zone of furnace 67 which may be similar in design to that of Fig. 1, the regenerated catalyst is recovered on conveyor 68. The regenerated catalyst is proportioned with fresh catalyst by means of proportioning system 69, and introduced into mixer 71. A slurry medium is introduced from line 70 into the mixer 71 and agitated with stirrer 72. The catalyst slurry is recycled to furnace 53 through lines 74 and 52 by pump 73. It should be noted that in the application of this invention to liquid phase conversion the laborious and time-consuming operation of filtering is eliminated. In this way a great saving is accomplished in cost of equipment and personnel expenses.

Catalysts having low vaporization temperatures such as aluminum chloride are recovered from sludges formed in the catalytic conversion process by feeding the sludge containing the catalyst into the burner and recovering the vaporized catalyst from the flue gas by electrical precipitation or other means.

The impinging plate 19 may be cooled by refrigeration, water spray, etc. so that the catalytic particles are cooled immediately upon contacting the plate. This arrangement shortens the heating time of the catalyst, thus decreasing the danger of sintering and overheating the catalyst.

EXAMPLE

A slurry consisting of oil A, spent catalyst B, and coke C, was atomized with fuel gas D and sprayed into the combustion zone G of a furnace similar to the type described. Steam F was used to drive the turbine impelling air E into the combustion zone of the furnace. The table below shows data for operation of the system described above as applied to the present invention under two different sets of conditions.

*Table*

| | | 1 | 2 |
|---|---|---|---|
| A | Oil in slurry, gal./hr | 136 | 136 |
| B | Catalyst, lb./hr | 272 | 272 |
| C | Coke on catalyst, lb./hr | 8.2 | 8.2 |
| D | Atomizing gas, CF/hr | 4,230 | 4,230 |
| E | Air, CF/min | 5,140 | 8,950 |
| | Per cent excess air | 15 | 100 |
| F | Steam to turn fan, lb./hr | 730 | 730 |
| G | Temperature, °F., of combustion zone | 3,490 | 2,360 |

The oil slurry for the above data carried 2 pounds of catalyst per gallon of oil. However, the weight of catalyst per volume of slurry medium increases with the fineness of the catalyst, and results in a more economical process. The excess air was furnished by redrilling the orifices in the turbine without requiring more steam. The spent catalyst contained 3% by weight of carbon.

In the foregoing example, slurry No. 1 was obtained from the fluid catalytic cracking of a 35° API gas oil using a finely divided acid activated clay type catalyst suspended in the vaporized feed. The conversion zone temperature was about 950° F. and the catalyst-oil ratio in the feed was about 1.5 pounds of catalyst per pound of feed. A flow rate corresponding to about one liquid volume of hydrocarbon per volume of catalyst chamber per hour was used.

Slurry No. 2 was obtained from the liquid phase catalytic cracking of a Mid-Continent crude oil using fuller's earth suspended in the liquid feed. The conversion was carried out at a temperature of about 900° F. and a pressure of about 400 pounds per square inch.

It should be noted that in carrying out the regeneration with 15% excess air the temperature of the combustion zone was 3500° F., but with a 100% excess air the temperature of the combustion zone had decreased to 2300° F. Furthermore, in both cases no material impairment of the activity of the catalyst was noticed as a result of regeneration at these high temperatures due largely to the short times involved.

I claim:

1. In a process for regenerating a finely divided catalyst contaminated with carbonaceous materials deposited during the conversion of hydrocarbons, in which said catalyst is separated from effluent from the conversion of said hydrocarbons and is introduced into a combustion zone to remove said carbonaceous material, the improvement which comprises admixing said catalyst with a liquid medium to form a slurry with said catalyst and said medium, injecting said slurry directly into and through the point of combustion of fuel in a combustion zone wherein said carbonaceous materials are rapidly removed from the catalyst by dislodgment and rapid combustion for a short time at a temperature of from 2,000° F. to 3,500° F. and the catalyst is regenerated, immediately cooling said regenerated catalyst, and removing unimpaired regenerated catalyst from the combustion zone.

2. In a process for regenerating a finely divided catalyst contaminated with carbonaceous materials deposited during the conversion of hydrocarbons, in which said catalyst is separated from the effluent from the conversion of said hydrocarbons and is introduced into a combustion zone to remove said carbonaceous materials, the improvement which comprises admixing said catalyst with a liquid fuel medium to form a suspension therein, injecting the suspension directly into and through the point of combustion of fuel and air wherein said liquid fuel medium comprises at least a portion of the combusting fuel and wherein said carbonaceous materials are removed from the catalyst by rapid combustion for a short time less than normal regeneration periods and at a temperature of from 2,000° F. to 3,500° F., immediately cooling regenerated catalyst below impairment temperature, and removing the resulting unimpaired regenerated catalyst from the combustion zone.

3. A process according to claim 2 in which the suspension is atomized with a fuel gas and injected into said combustion zone.

4. A process according to claim 2 in which the suspension is compressed at high pressure to force the liquid fuel medium into the pores and capillaries of said catalyst before injection into the combustion zone.

5. In a process for regenerating a finely divided catalyst having a particle size within the range of 30 to 400 mesh, which is contaminated with carbonaceous materials deposited during the conversion of hydrocarbons and which is separated from the effluent from the conversion, the improvement which comprises admixing the catalyst with water to form a slurry, burning a mixture of fuel gas and air to form a combustion zone, injecting the slurry into and through said combustion zone at the point of combustion whereby the slurry is instantaneously vaporized and the carbonaceous materials are removed by rapid combustion for a short period of time at a temperature of from 2,000° F. to 3,500° F. without impairing the intrinsic activity of said catalyst, and removing the resulting unimpaired regenerated catalyst from the combustion zone.

6. A process according to claim 5 in which the slurry is atomized with a fuel gas and injected into said combustion zone.

JOHN GORDON ALLEN.

REFERENCES CITED

The following references are of record in the file of this patent:

UNITED STATES PATENTS

| Number | Name | Date |
| --- | --- | --- |
| 2,237,339 | De Florez | Apr. 8, 1941 |
| 2,275,184 | Mekler | Mar. 5, 1942 |
| 2,307,672 | Dunham | Jan. 5, 1943 |
| 2,311,978 | Conn | Feb. 23, 1943 |
| 2,325,115 | Egloff | July 27, 1943 |
| 2,327,510 | Day | Aug. 24, 1943 |
| 2,348,576 | Seguy | May 9, 1944 |
| 2,382,724 | Kollenberg | Aug. 14, 1945 |
| 2,407,371 | Jahnig | Sept. 10, 1946 |
| 2,412,696 | Schonberg | Dec. 17, 1946 |
| 2,414,883 | Martin | Jan. 28, 1947 |
| 2,420,049 | Martin | May 6, 1947 |
| 2,433,798 | Voorhees | Dec. 30, 1947 |
| 2,429,127 | Graham et al. | Oct. 14, 1947 |
| 2,445,351 | Gohr | July 20, 1948 |